(12) United States Patent
Abdelkarim

(10) Patent No.: US 11,707,671 B2
(45) Date of Patent: Jul. 25, 2023

(54) ANAMORPHIC DISPLAY DEVICE

(71) Applicant: Ahmed Abdelkarim, Doha (QA)

(72) Inventor: Ahmed Abdelkarim, Doha (QA)

(73) Assignee: Ahmed Abdelkarim, Doha (QA)

( * ) Notice: Subject to any disclaimer, the term of this patent is extended or adjusted under 35 U.S.C. 154(b) by 596 days.

(21) Appl. No.: 16/491,795

(22) PCT Filed: Mar. 6, 2018

(86) PCT No.: PCT/QA2018/050001
§ 371 (c)(1),
(2) Date: Sep. 6, 2019

(87) PCT Pub. No.: WO2018/164595
PCT Pub. Date: Sep. 13, 2018

(65) Prior Publication Data
US 2020/0384356 A1    Dec. 10, 2020

Related U.S. Application Data

(60) Provisional application No. 62/467,944, filed on Mar. 7, 2017.

(51) Int. Cl.
*A63F 13/26*     (2014.01)
*A63F 13/92*     (2014.01)
*H04N 13/302*   (2018.01)
*H04N 13/366*   (2018.01)
*G06F 1/16*      (2006.01)
(Continued)

(52) U.S. Cl.
CPC .............. *A63F 13/26* (2014.09); *A63F 13/92* (2014.09); *G06F 1/1681* (2013.01); *G06F 3/0412* (2013.01); *G06F 3/1446* (2013.01); *G09G 3/003* (2013.01); *H04N 13/302* (2018.05);
(Continued)

(58) Field of Classification Search
CPC .... A63F 13/26; A63F 13/92; A63F 2300/301; A63F 2300/1087; G09G 3/003; G09G 2300/026; G09G 2340/14; G09G 5/00; G09G 2370/16; H04N 13/302;
(Continued)

(56) References Cited

U.S. PATENT DOCUMENTS 5,467,102 A    11/1995    Kuno et al.
5,537,127 A     7/1996    Jingu
(Continued)

OTHER PUBLICATIONS

International Preliminary Report on Patentability for related International Application No. PCT/QA2018/050001; action dated Jun. 23, 2020; (7 pages).
(Continued)

*Primary Examiner* — Yaron Cohen
(74) *Attorney, Agent, or Firm* — K&L Gates LLP

(57) ABSTRACT

An anamorphic display device is provided. The anamorphic device includes a secondary display configured to be detachably coupled to a computing device including a primary display; and a non-transitory device operatively coupled to the primary and secondary displays and having instructions thereon that are configured, when executed, to render an anamorphic image on at least one of the primary and secondary displays so as to create, in combination, a three-dimensional effect from a point of view facing the primary and secondary displays.

20 Claims, 16 Drawing Sheets

(51) Int. Cl.
*G06F 3/041* (2006.01)
*G06F 3/14* (2006.01)
*G09G 3/00* (2006.01)

(52) U.S. Cl.
CPC .... *H04N 13/366* (2018.05); *A63F 2300/1087* (2013.01); *A63F 2300/301* (2013.01)

(58) Field of Classification Search
CPC ... H04N 13/366; G06F 1/1681; G06F 3/1423; G06F 3/1446; G06F 3/0412
See application file for complete search history.

(56) References Cited

U.S. PATENT DOCUMENTS

| | | |
|---|---|---|
| 5,790,371 A | 8/1998 | Latocha et al. |
| 6,011,545 A | 1/2000 | Henderson et al. |
| 6,262,785 B1 | 7/2001 | Kim |
| 7,371,163 B1 | 5/2008 | Best |
| 7,414,594 B2 | 8/2008 | Kim et al. |
| 7,714,801 B2 | 5/2010 | Kimmel |
| 8,241,124 B2 | 8/2012 | Kelly et al. |
| 8,253,648 B2 | 8/2012 | Nagai et al. |
| 8,482,480 B2 | 7/2013 | Kim et al. |
| 8,508,432 B2 | 8/2013 | Shim et al. |
| 8,576,185 B2 | 11/2013 | Yamashita |
| 8,760,364 B2 | 6/2014 | Kim et al. |
| 8,970,478 B2 | 3/2015 | Johansson |
| 2009/0258697 A1* | 10/2009 | Kelly .................. G07F 17/3211 463/20 |
| 2012/0200495 A1* | 8/2012 | Johansson ........... H04N 13/279 345/156 |
| 2014/0099996 A1* | 4/2014 | Houryu |
| 2015/0145969 A1* | 5/2015 | Kim .................... G02B 3/0068 348/51 |
| 2017/0205923 A1* | 7/2017 | Shim .................... G06F 3/0416 |
| 2018/0129462 A1* | 5/2018 | Han et al. |

OTHER PUBLICATIONS

Written Opinion for related International Application No. PCT/QA2018/050001; action dated Jun. 9, 2020; (6 pages).
International Search Report for related International Application No. PCT/QA2018/050001; action dated Jun. 9, 2020 (2 pages).

* cited by examiner

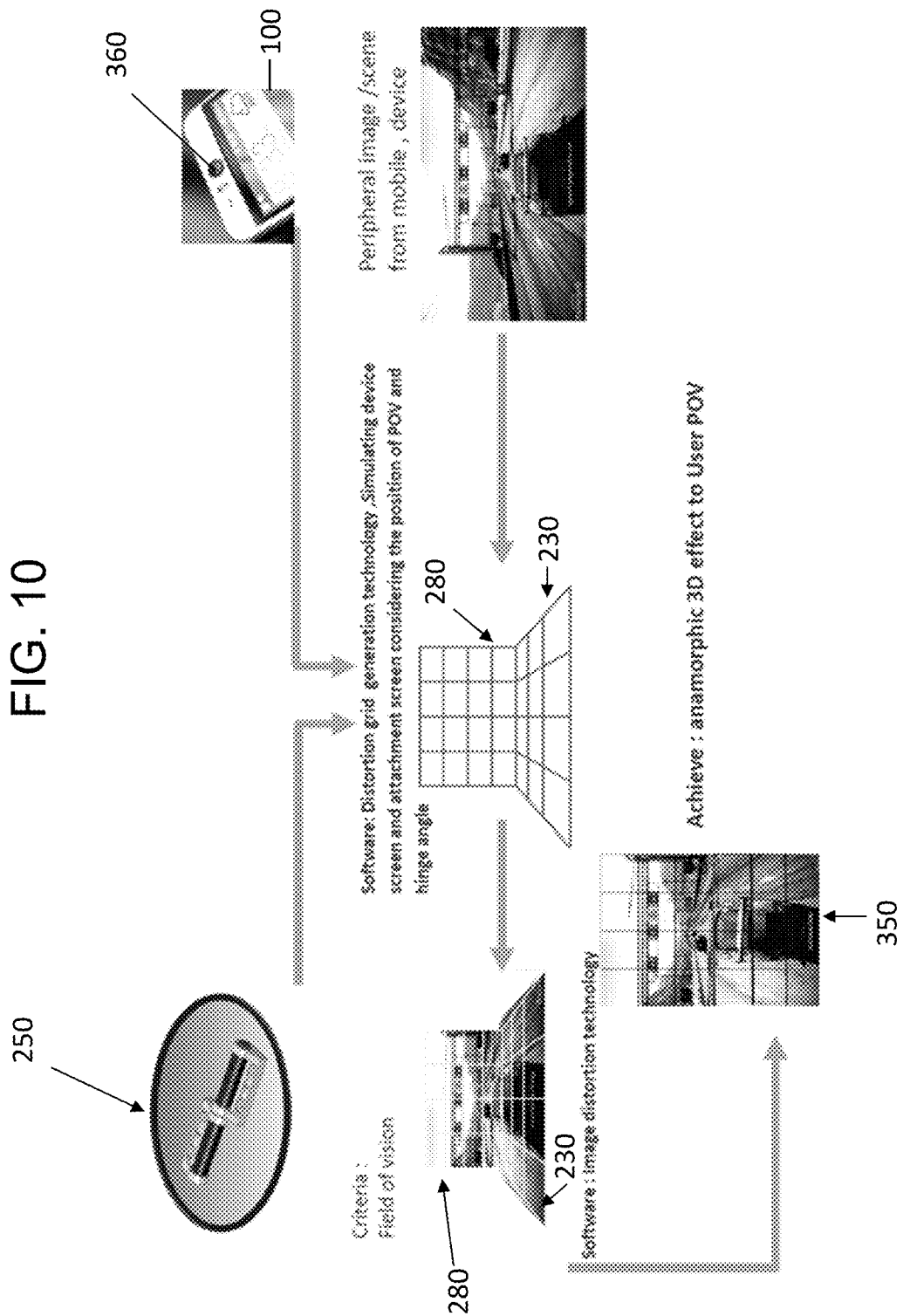

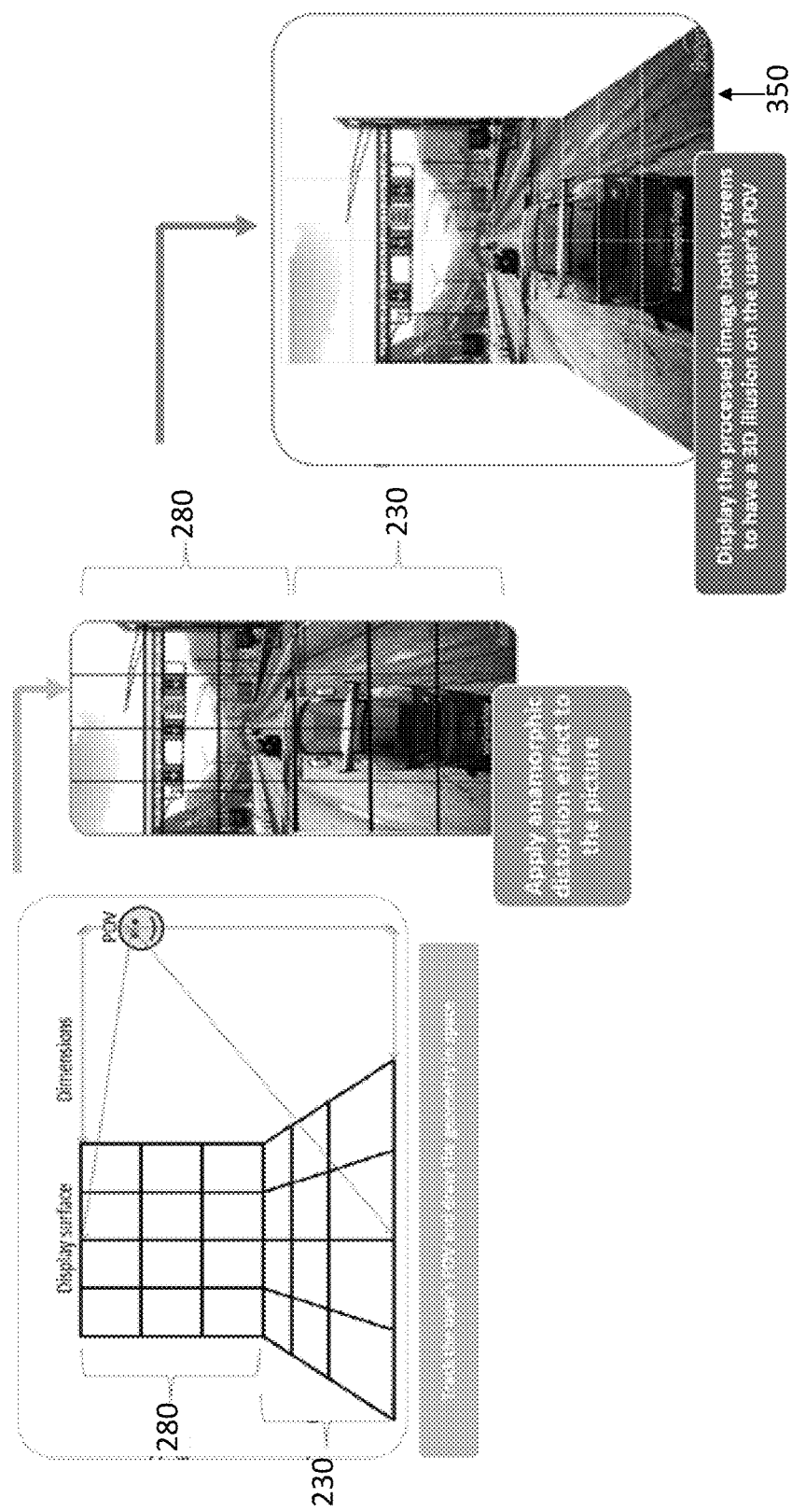

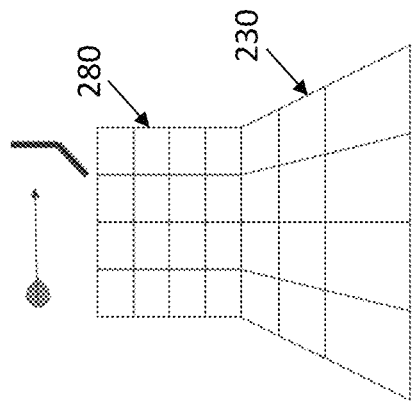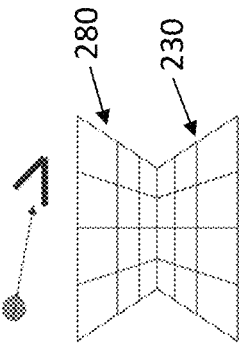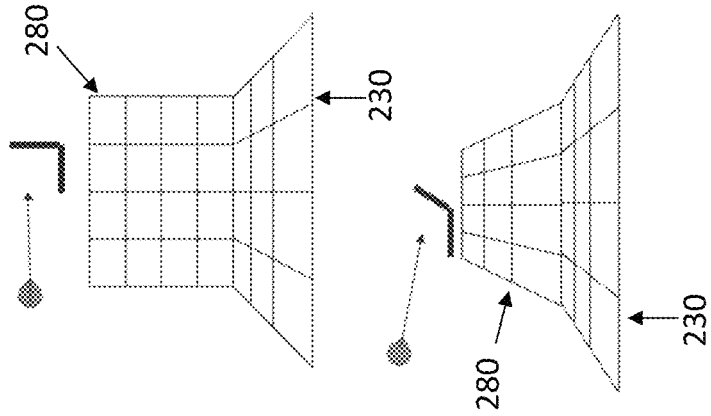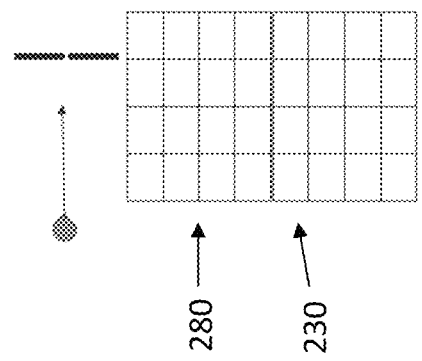

ANAMORPHIC DISPLAY DEVICE

CROSS REFERENCE TO RELATED APPLICATION

The present application is a National Stage filing under 35 U.S.C. 371 of International Application No. PCT/QA2018/050001, filed on Mar. 6, 2018 which claims the benefit of U.S. Provisional Patent Application No. 62/467,944, filed Mar. 7, 2017, the disclosure of which is incorporated into this specification by reference in its entirety.

BACKGROUND

The present disclosure generally relates to an anamorphic display device. Display configurations are generally known for viewing images from one or more displays.

SUMMARY

The present disclosure generally relates to an anamorphic display device.

According to one non-limiting aspect of the present disclosure, an example embodiment of an anamorphic display device is described. The anamorphic display device includes a secondary display configured to be detachably coupled to a computing device including a primary display, and a non-transitory device operatively coupled to the primary and secondary displays. The non-transitory device has instructions thereon that are configured, when executed, to render an anamorphic image on at least one of the primary and secondary displays so as to create, in combination, a three-dimensional effect from a point of view facing the primary and secondary displays.

According to another non-limiting aspect of the present disclosure, an example embodiment of a method for displaying an anamorphic image is described. The example method for displaying an anamorphic image includes generating, via a processor, a non-rectangular virtual frame. An anamorphic image is rendered, via the processor, within the non-rectangular virtual frame. An anamorphic display device comprising primary and secondary displays is caused, via the processor, to display the anamorphic image, so as to create, in combination, a three-dimensional effect from a point of view facing the primary and secondary displays.

In an embodiment, a gaming attachment is configured to be operably coupled to a computing device through a hinged pocket interface, thereby forming the anamorphic display device. Once the gaming attachment is connected to the computing device software installed in the gaming attachment can convert standard images into anamorphic images displayable on the combined displays of the gaming attachment and computing device.

It is accordingly an advantage of the present disclosure to provide anamorphic display devices and methods that create anamorphic images that produce a three-dimensional effect to the user point-of-view with increased depth perception.

Additional features and advantages are described herein, and will be apparent from the following Detailed Description and the figures.

BRIEF DESCRIPTION OF THE FIGURES

Features and advantages of the anamorphic display devices and methods described herein may be better understood by reference to the accompanying drawings in which:

FIG. 10 is a flow chart of a non-limiting embodiment of a method for displaying an anamorphic image according to the present disclosure;

FIG. 12 is a schematic view showing an image displayed on the anamorphic display device;

FIGS. 13A-13E are schematic views of virtual frames for displaying an anamorphic image according to the present disclosure;

Figure 1:
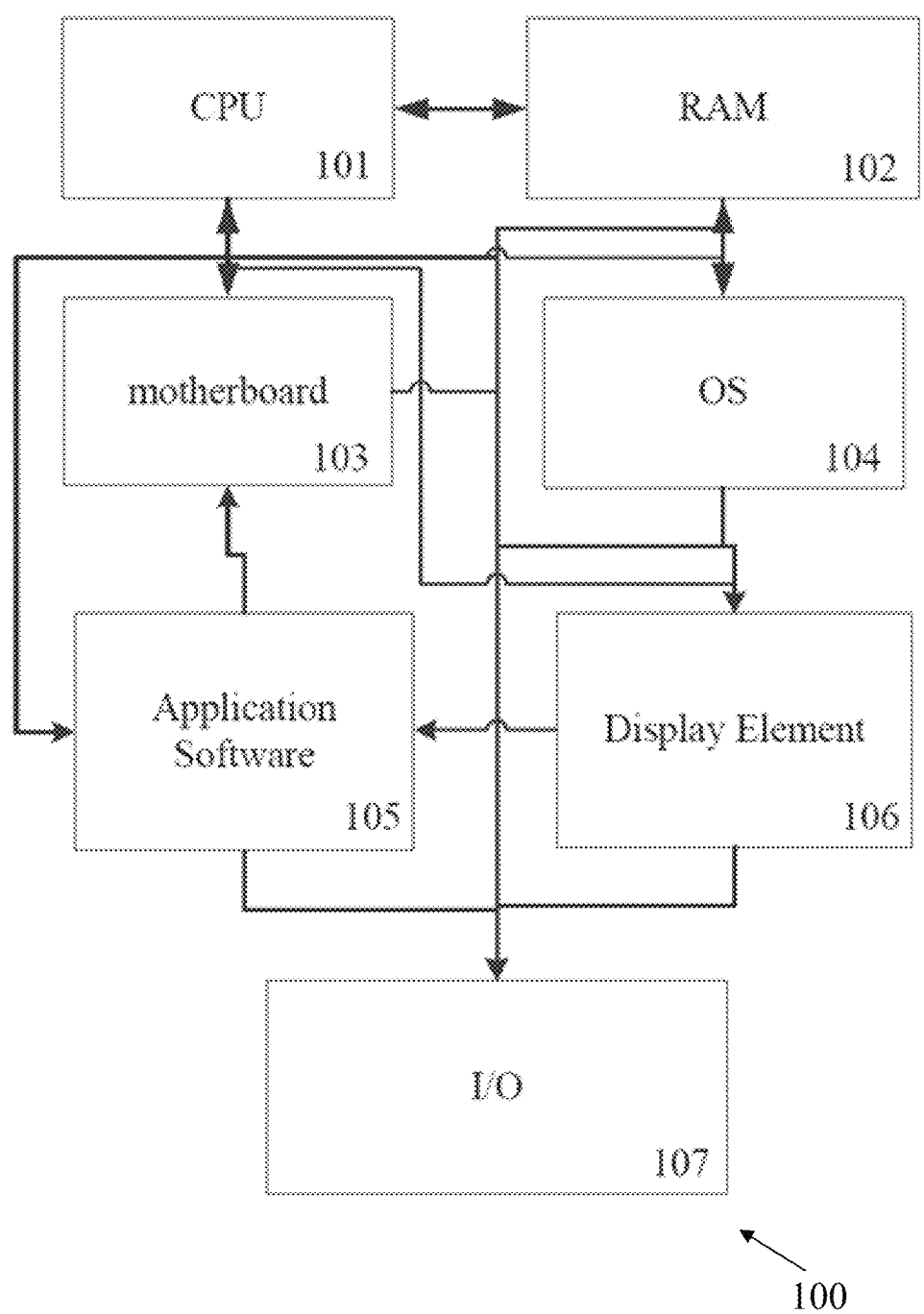
FIG. 1 is a schematic illustration of a non-limiting embodiment of a anamorphic display device according to the present disclosure.

The reader will appreciate the foregoing details, as well as others, upon considering the following detailed description of certain non-limiting embodiments of anamorphic display devices and methods according to the present disclosure. The reader may also comprehend certain of such additional details upon using the anamorphic display devices and methods described herein.

DETAILED DESCRIPTION

The present disclosure generally relates to an anamorphic display device. As described herein, the anamorphic display device is configured to create anamorphic images that produce a three-dimensional effect to the user point-of-view with increased depth perception.

Before any embodiments of the invention are explained in detail, it is to be understood that the terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

The present disclosure, in part, is generally related to a gaming attachment that is configured to be operably coupled to a computing device, such as a tablet, a smart phone, or a mobile or portable gaming device. The gaming attachment provides a secondary display for the connected computing device, thereby forming a multi-screen device capable of displaying 3D anamorphic images. When the gaming attachment is connected to the computing device their respective displays are adjoined to form a continuous display surface. In certain non-limiting embodiments, the gaming attachment includes a hinged connection interface configured to connect to the computing device. Software installed on the gaming attachment is configured to generate an anamorphic image on the combined adjoining displays, (i.e., the computing device display, hereinafter referred to as the "primary display," and the gaming attachment display, hereinafter referred to as the "secondary display") based on detected configuration information, and relative orientation or angle between the displays. The anamorphic image displayed on the connected displays may be generated from an acquired user point-of-view (UPOV) image or other type of image.

As shown in FIG. 1, one of ordinary skill in the art would appreciate that a computing device 100 appropriate for use with embodiments of the present application may generally be comprised of one or more of a Central Processing Unit (CPU) 101, a Random Access Memory (RAM) 102, and a storage medium (e.g., hard disk drive, solid state drive, flash memory) 103. Examples of computing devices usable with embodiments of the present disclosure include, but are not limited to, personal computers, smart phones, laptops, mobile computing devices, tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present disclosure are contemplated for use with any computing device.

In an exemplary embodiment according to the present disclosure, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be consumed by a user of a computing device whether connected to a network or not. According to an embodiment of the present disclosure, some of the applications of the present disclosure may not be accessible when not connected to a network; however, a user may be able to compose data offline that will be consumed by the system when the user is later connected to a network.

Figure 2:
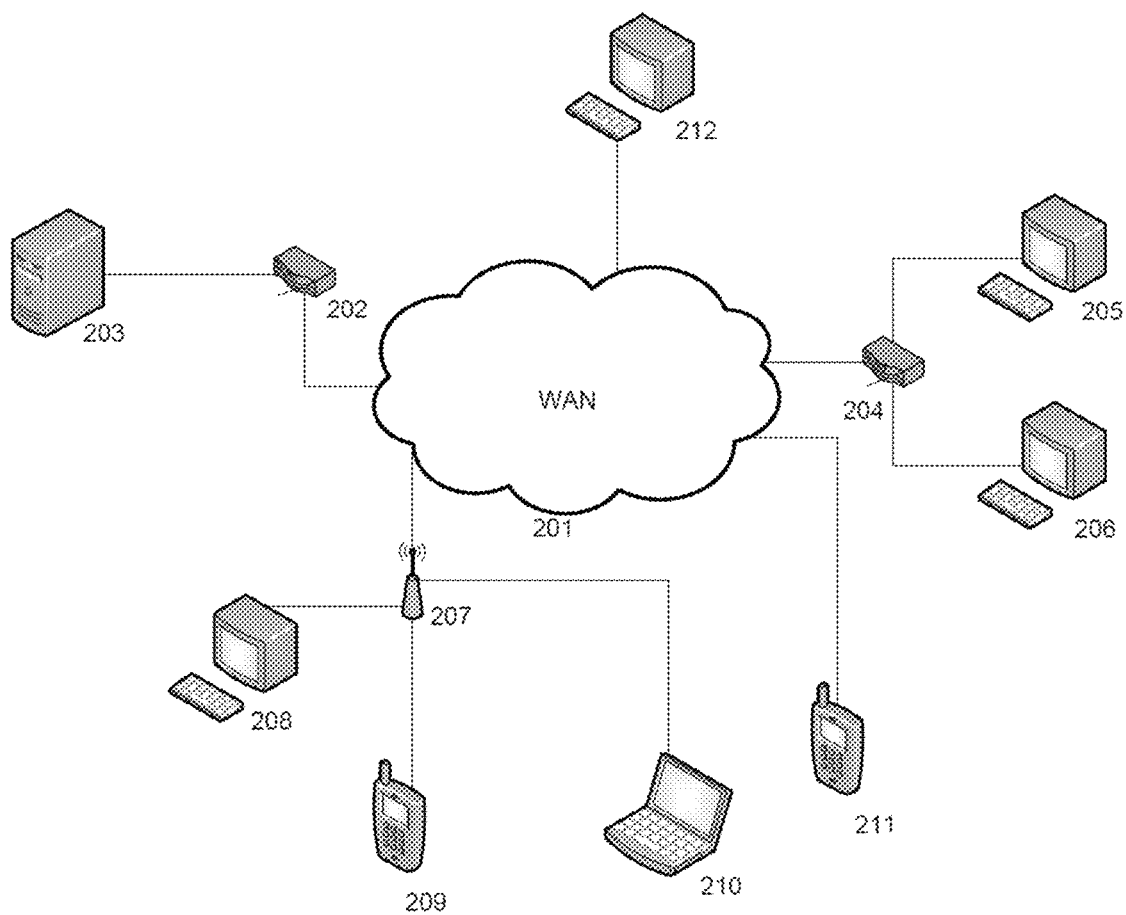
FIG. 2 is a schematic overview of a network, in accordance with a non-limiting embodiment according to the present disclosure.

Referring to FIG. 2, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways a server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components of the system may connect to server 203 via WAN 201 or other network in numerous ways. For instance, a component may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art would appreciate that there are numerous ways that a component may connect to server 203 via WAN 201 or other network, and embodiments of the present disclosure are contemplated for use with any method for connecting to server 203 via WAN 201 or other network. Furthermore, the server 203 could be comprised of a personal computing device, such as a smartphone, acting as a host for other computing devices to connect to.

Figure 3:
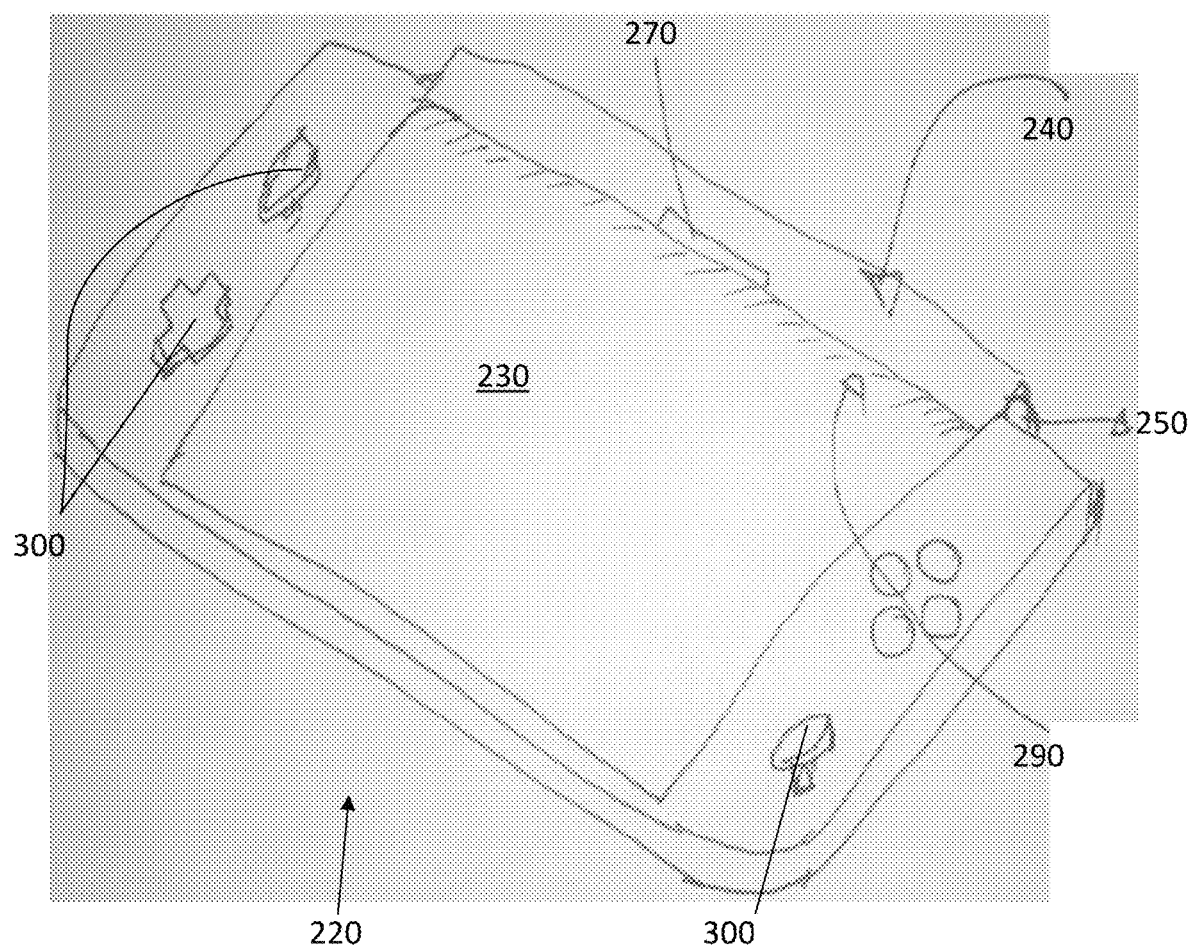
FIG. 3 illustrates a perspective view of a gaming attachment, in accordance with a non-limiting embodiment according to the present disclosure.
Figure 4:
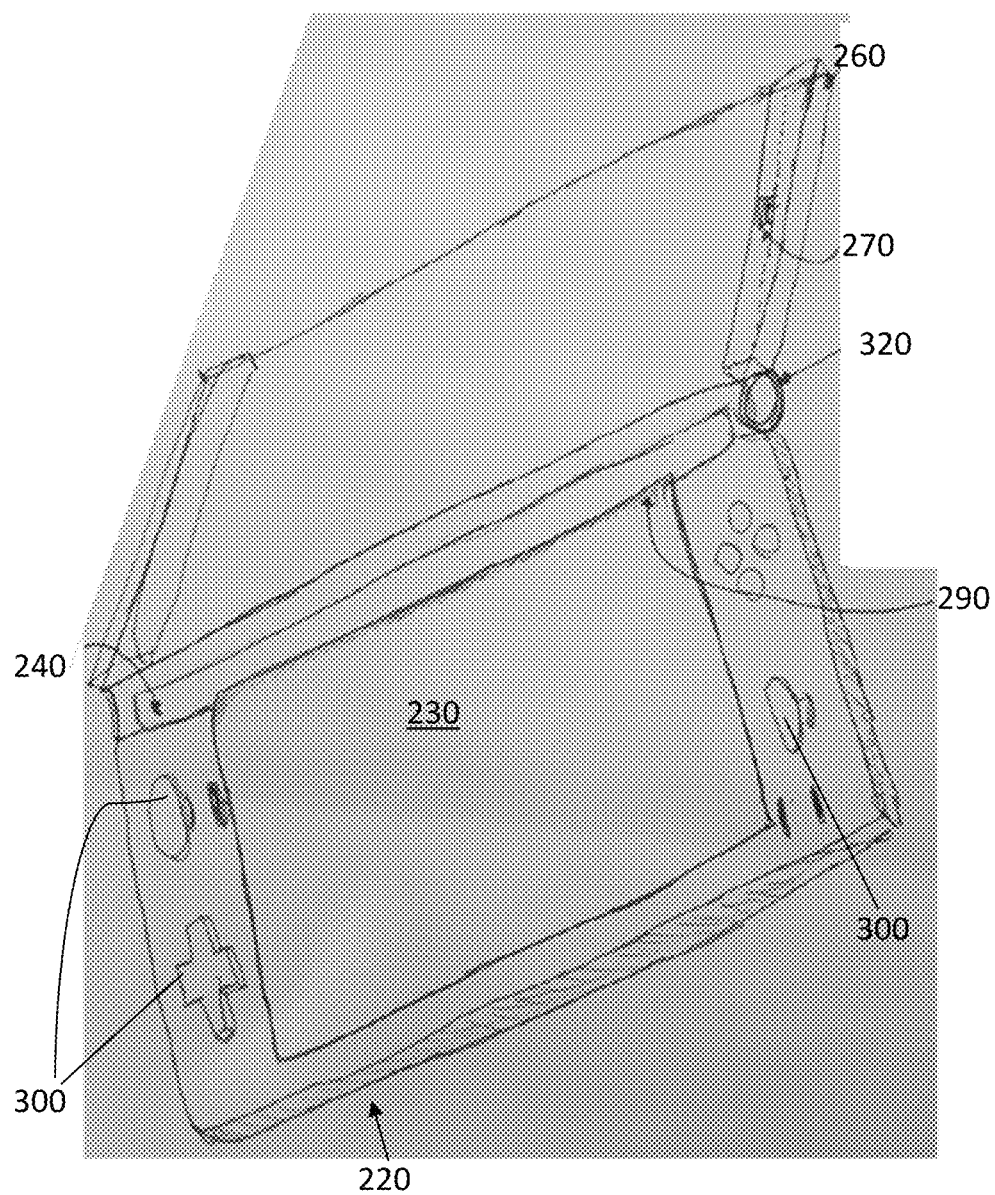
FIG. 4 illustrates the gaming attachment of FIG. 3 connected to a computing device to form a multi-screen anamorphic display device, in accordance with a non-limiting embodiment according to the present disclosure.

Referring to FIG. 3 and FIG. 4, an illustrated embodiment of the anamorphic display device 220 includes a display screen 230. In certain non-limiting embodiments, the anamorphic display device 220 is a gaming attachment configured to be coupled to a hand held computing device or gaming device 100 (not shown; see FIGS. 5-9), such as the Nintendo Switch®.

In one exemplary embodiment the computing device 100 is seated in a pocket 240 of the attachment device 220. In some embodiments, the pocket 240 includes a hinge mechanism 250 that allows the connected computing device 100 to rotate relative to the gaming attachment 220. More specifically, the hinge mechanism 250 enables adjustment of the orientation or angle between the gaming attachment 220 and the computing device 100 once they are connected. In some embodiments, peripheral side holders 260 extend from the hinged pocket 240 to further secure the gaming device 100 in a position attached to the gaming attachment 220.

In some embodiments, connection between the two devices 100, 220 is established when the computing device 100 is inserted in the hinged pocket 240 of the gaming attachment 220. For example, a USB connection port on the computing device is configured to receive a USB connector 270 from the gaming attachment 220 that may be used for communication and data exchange. In other embodiments, the primary display 280 of the computing device 100 and the secondary display 230 of the gaming attachment 220 can be operably coupled via a wired or wireless connection selected from the group consisting of a WiFi connection, a Bluetooth connection, an HDMI connection, a DVI connection, and a FireWire connection. The anamorphic display devices and methods described herein are not limited in this regard.

When the gaming attachment 220 is coupled to the computing device 100 the combined displays form a continuous display surface creating the appearance of a larger extended display. To this end, one or both of the primary display 280 and the secondary display 230 may include a curved screen edge 290 that can be utilized to facilitate elimination of any gap between the primary display 280 and secondary display 230 and create a more uniform, continuous display surface between the abutting primary and secondary displays 280, 230.

The gaming attachment 220 may also include supplemental controls 300 for the attached computing device 100. The supplemental controls 300 may be configured to provide user input for games or other applications run on the computing device 100 with connected gaming attachment 220. One of ordinary skill will appreciate that the supplemental controls 300 are not limited to providing input for games and may be used to provide input for any type of program running on the combined computing device 100 and gaming attachment 220.

The gaming attachment 220 of the present disclosure includes a memory that is encoded with instructions for transforming an image acquired from an input device such as a camera, or an image stored in memory, into an anamorphic 3D image that is displayed on the combined primary and secondary displays. The gaming attachment 220 may relay the instructions through a wired or wireless connection between the gaming attachment 220 and the computing device 100. For example, the gaming attachment may utilize the data connection 270 in the pocket 240 to exchange data with the computing device 100.

Figure 5:
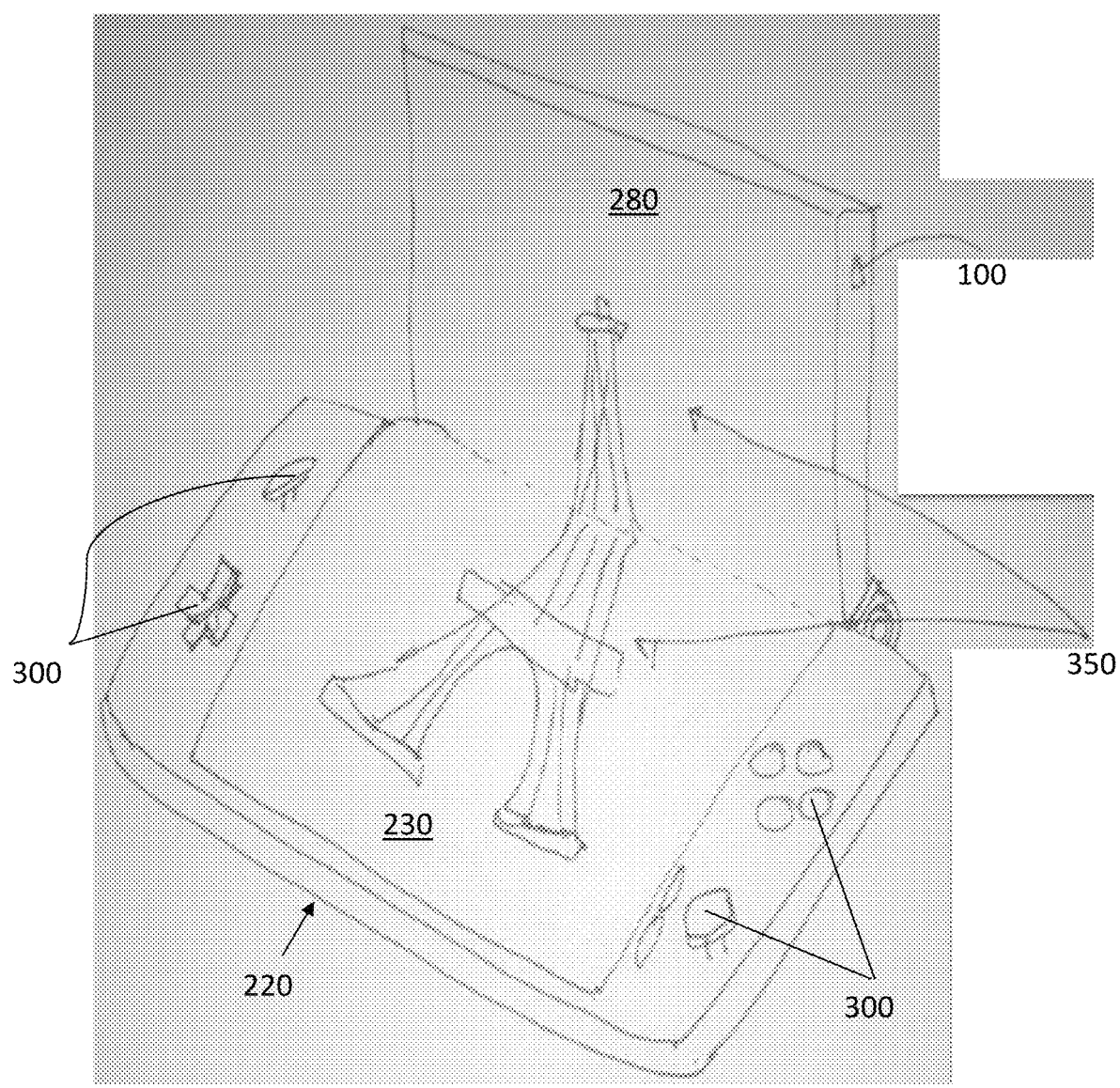
FIG. 5 is a perspective view of the anamorphic display device, in accordance with a non-limiting embodiment according to the present disclosure.

FIG. 5 illustrates the computing device 100 with the gaming attachment 220 connected to the computing device 100 according to an embodiment. The combined computing device 100 with the gaming attachment 220 is in an open position with the secondary display screen 230 in a horizontal plane and the primary display screen 280 in a vertical plane. An anamorphic image 310 representing a user point-of-view is displayed on the abutting primary and secondary display screens 280, 230. The illustrated primary screen 280 constitutes the upper part of the display, while the secondary screen 230 constitutes the bottom part of the display. As used herein, the terms "top," "bottom," "front," "rear," "side," "upper," "lower," and other directional terms are not intended to require any particular orientation, but are instead used for purposes of description only. The original acquired image may be resized and/or distorted to create the anamorphic display image 300 which includes the visual effect of greater depth perception.

In one exemplary embodiment, the pocket 240 of the gaming attachment 220 includes one or more sensors 320 that are configured to detect the relative orientation or angle between the gaming attachment 220 and the computing device 100. The relative orientation data is utilized by the software installed in the gaming attachment 220 to create the anamorphic image 300.

Figure 6:
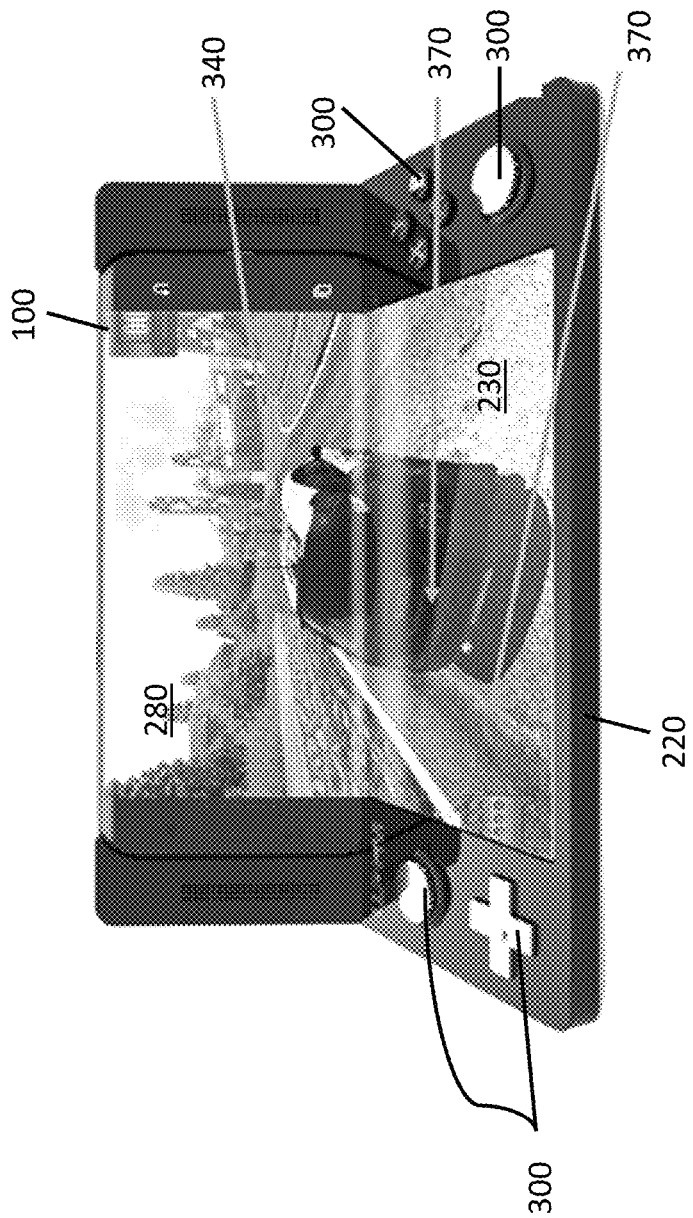
FIG. 6 is a perspective view of another non-limiting embodiment of a anamorphic display device according to the present disclosure.
Figure 7:
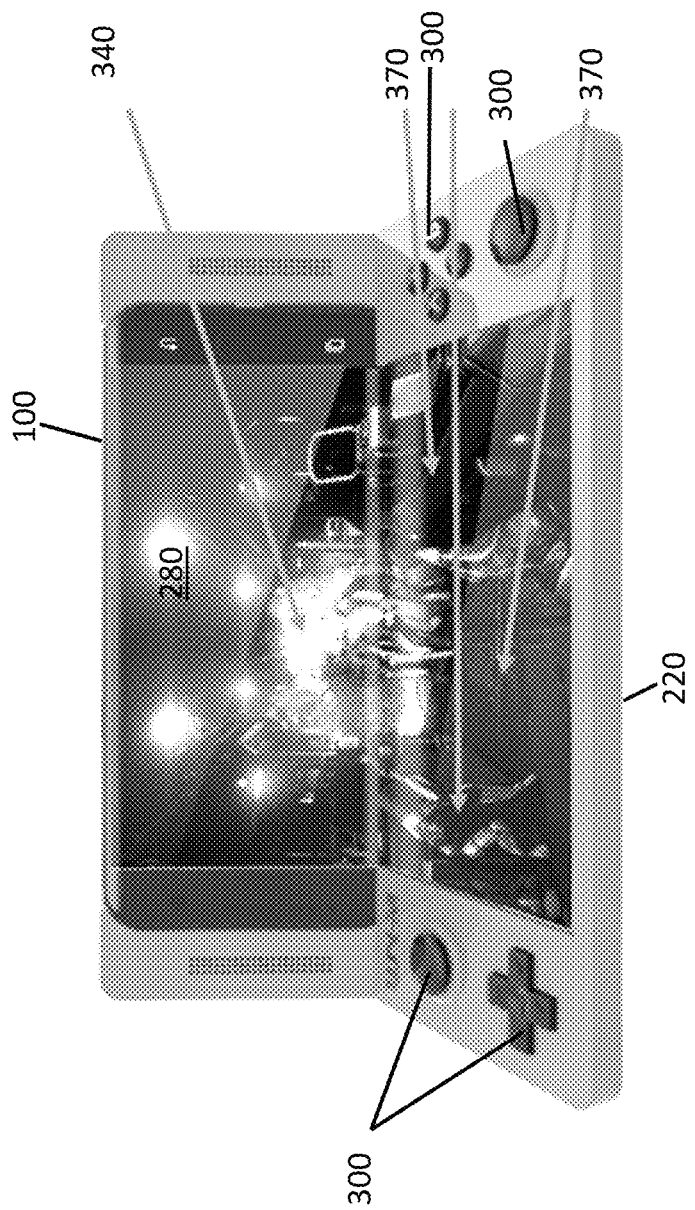
FIG. 7 is a perspective view of yet another non-limiting embodiment of a anamorphic display device according to the present disclosure.
Figure 8:
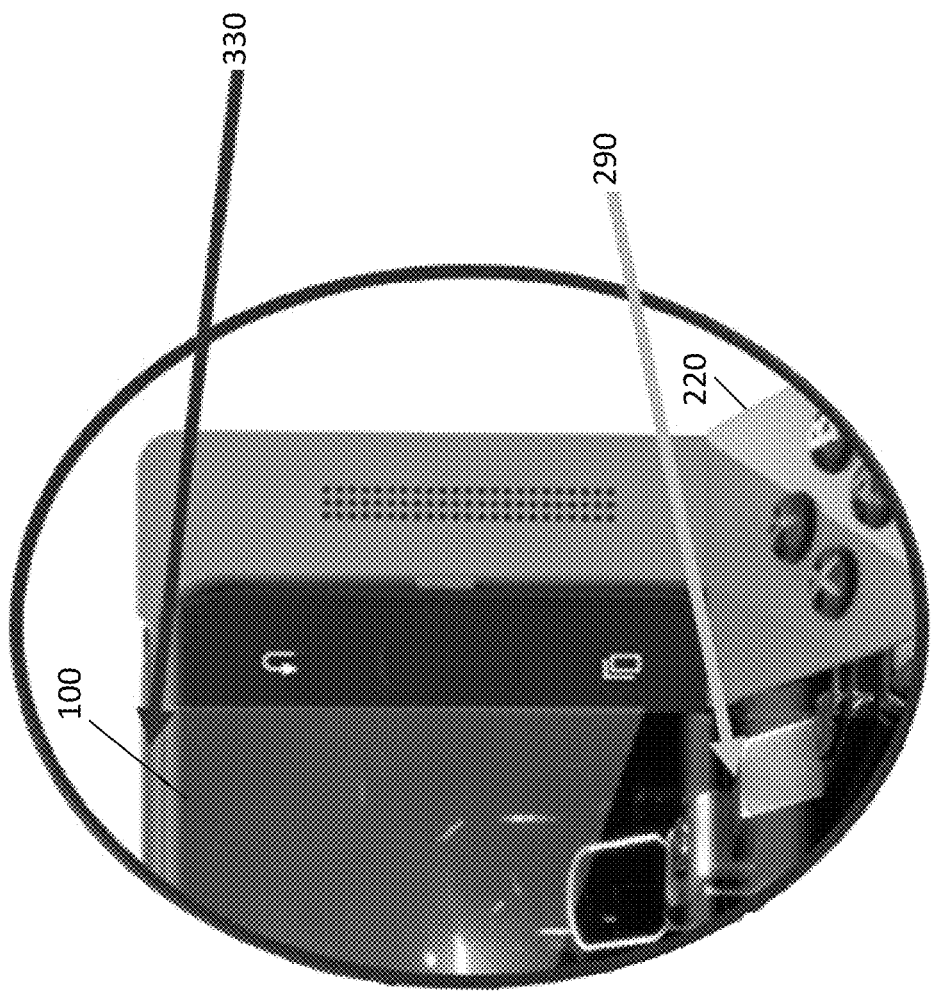
FIG. 8 is an enlarged partial view of the anamorphic display device of FIG. 7.

Referring to FIGS. 6-8, in the illustrated embodiment the anamorphic display device 220 is configured to render images on the displays of the gaming attachment 220 and the computing device 100 that overlap with each other. Normally, when two screens or displays are placed next to each other, they will be separated by the frame housing 330 or what is known as a bezel. It is to be understood that the term "bezel" as used herein is intended for a border area of a panel housing that surrounds or adjoins the display area. Depending on the usage requirements or preferences for the particular display device, a bezel may reduce the commercial value and may be unwanted by users or customers. In the illustrated embodiment, the bezel 330 from the primary screen 280 of the smart phone/tablet/portable gaming console 100 is hidden behind the curved edge 290 of the secondary screen 230 of the gaming attachment 220. For example, the hinge 250 can be designed for 360° foldability, where the bezel 330 is covered by the curve 290 of the secondary screen 230 of the gaming attachment 220 when viewed or looked at from a user point-of-view (UPOV). As such, unwanted or undesired separation of two screens caused by the bezel 330 can be eliminated, and the two screens 280, 230 can appear as if being a unified canvas from the viewing angle of the user.

Figure 9C:
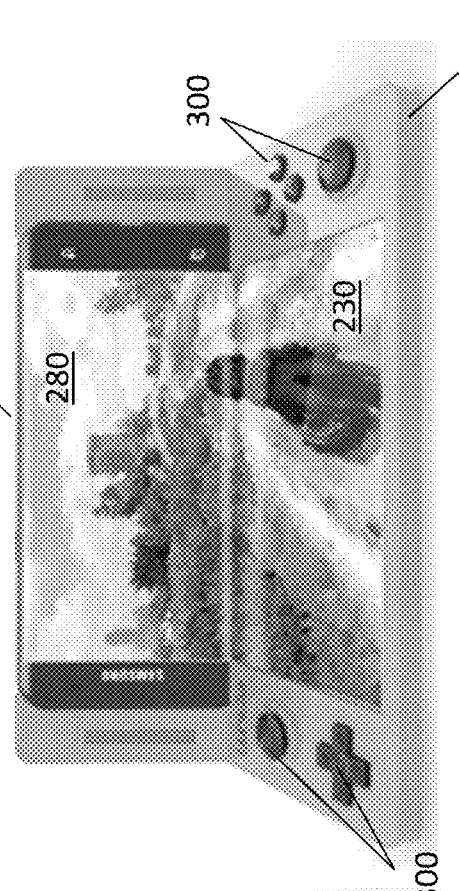
FIGS. 9A-9D are perspective views of other non-limiting embodiments of a anamorphic display device according to the present disclosure.
Figure 9D:
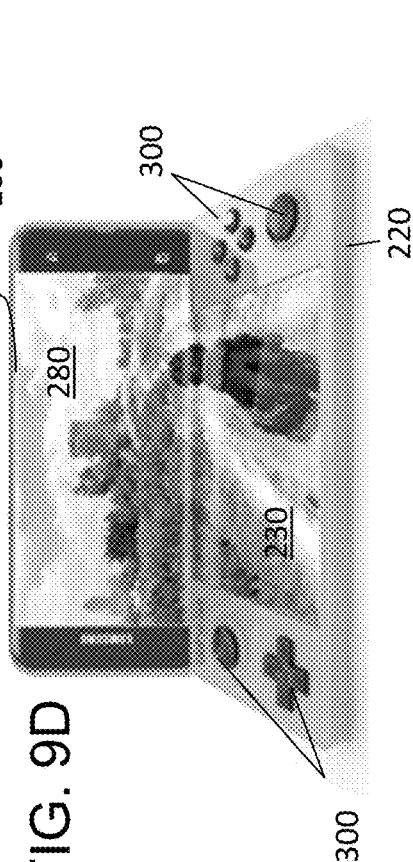
Figure 9A:
Figure 9B:
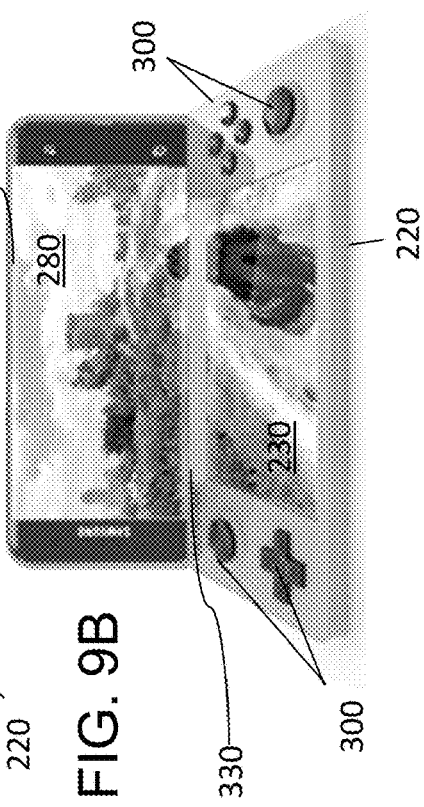

FIGS. 9A-9D show the difference between display devices where the bezel separates the screens or displays, and where the bezel is eliminated. For example, FIGS. 9A-9B are perspective views of display devices where the bezel 330 separates the two screens 280, 230. In contrast, FIGS. 9C-9D are perspective views of display devices where the bezel is eliminated. With continuing reference to FIG. 9C, in certain non-limiting embodiments the displays of the gaming attachment 220 and the computing device 100 define substantially congruent display shapes. In other embodiments, however, the display 230 of the gaming attachment 220 may assume any other geometric form, including, but not limited to, a substantially rectangular shape that is linearly offset in width from the primary display 280 when the gaming attachment 220 is coupled to the computing device 100.

With continuing reference to FIGS. 6-7, the illustrated embodiments of the anamorphic display device 220 are configured to render a gaming interactive event 340 on the display 280 of the computing device 100, as further explained below. For example, the software installed in the attachment device 220 acquires one or more images or image frames through a camera connected to the computing device 100. The software then converts each image frame of the acquired image(s) into two image frames, one that is output to the primary display 280 and the other output to the secondary display 230. Referring also to FIG. 5, the image frames are then displayed in such a way as to create an anamorphic 3D image 350 displayed on the combined primary and secondary displays 280, 230. The acquired image may be a UPOV or other type of image that is resized and converted into the anamorphic image 350 using the image processing software installed in the gaming attachment 220 which utilizes configuration data from the attached devices (i.e., gaming attachment 220 and computing device 100) as well as the relative orientation between the displays as provided by sensors 320 in the pocket 240. One of ordinary skill in the art will understand that the image processed by the gaming attachment 220 may be one or more static images or video images. The anamorphic image 350 is then displayed on the combined screens 280, 230 which provide the appearance of a single continuous display screen.

Figure 11:
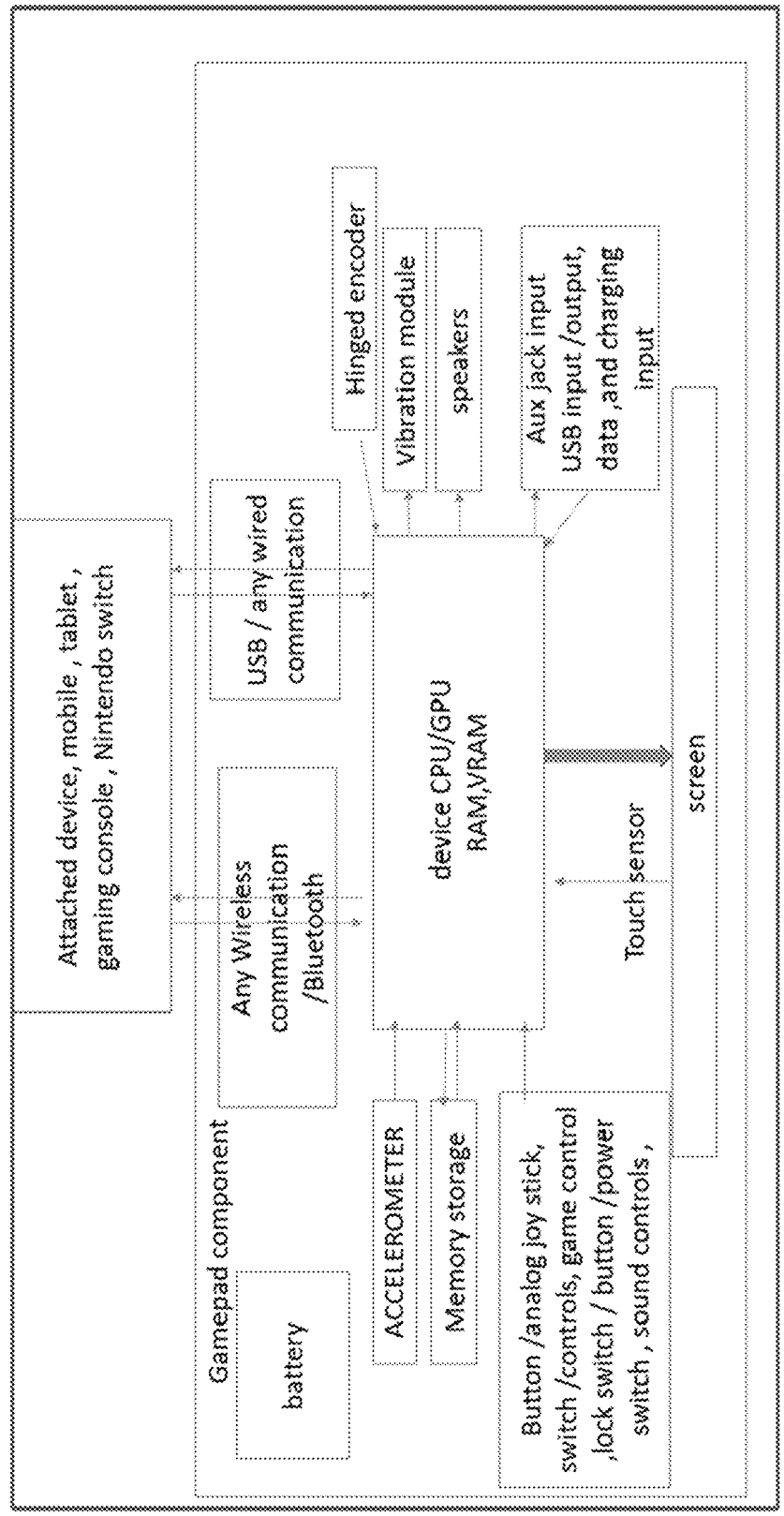
FIG. 11 is a schematic view of a non-limiting embodiment of an anamorphic display device according to the present disclosure.

Referring to FIGS. 10-12, non-limiting embodiments of anamorphic display devices and methods are illustrated. According to certain non-limiting embodiments, UPOV estimation or tracking can be achieved using a front camera 360, a depth sensor, or a lookup table. For example, the lookup table can estimate the UPOV positions based on the value of the angle determined from an accelerometer sensor. These inputs are used to formulate a virtual mask or frame of two surfaces in dependence upon the screen orientation. A real time or recorded input is received from the computing device 100, and the non-transitory device of the anamorphic display device is configured to render the anamorphic image anamorphic image by geometrically apportioning part of the image to the primary display 280 and part of the image to the secondary display 230. The image processing software of the gaming attachment 220 may distort at least one of the apportioned images to create the anamorphic image as shown in FIG. 12.

In certain non-limiting embodiments, the image input can be separated in a manner intended to reduce or eliminate the dependence to and need of UPOV tracking. The input may include a gaming interactive event 340 and a gaming non-interactive event 370. A "gaming interactive event (IE)" and a "gaming non-interactive event (NIE)" are terms of art and will be readily understood by those having ordinary skill in gaming devices. Typically, an IE is an event that causes or requires action or reaction by the device user or game player, e.g., a shooting target or enemies, emerging road horizon, or the upper part of the third-person character that can allow the user to hit, shoot, or get hit. In contrast, an NIE is an event that can include a peripheral display element, for example a pop-out object or driving-road landscape, which may contribute to depth perception. It is to be understood that the terms "gaming interactive event (IE)" and "non-gaming event ("NIE")" as used herein are intended for any gaming in a generic sense and are not limited to shooting or driving games.

In certain non-limiting embodiments, a virtual mask or frame is used to determine which of the peripheral image parts is set to output to the real output. Stated lightly differently, while the gaming interactive event is generated, it can be determined which content is to be output on the screens of the gaming attachment and the computing device. According to certain non-limiting embodiments, the processor of the non-transitory device can sort the type of content in game data into IE and NIE, and determine which content from the game should appear on each screen, based on classification of the content in game data. In certain non-limiting embodiments, the virtual mask or frame can set up a dummy screen split based on where certain events are more likely to appear based on the game application programming interface (API) from the content creator. In other embodiments, the content creator can manually identify the events to show on the primary or secondary screen based on the criteria of IE and NIE.

According to an embodiment, a method of arranging gaming content to the primary and secondary screens is provided that can influence the user behavior to focus over the primary screen, and reduce the dependence to and need of UPOV tracking or even eliminate it. By influencing the user's behavior to have a semi-90° angle line-of-sight over the primary screen center, stress and processing capacity can be reduced for the software program of the computing device described herein. The secondary screen will appear to the user as an extended image, and contribute in creating the three-dimensional depth or pop-out effect. In other embodiments, however, transmission of the image output can be achieved without separating the gaming interactive event from the peripheral display element.

With continuing reference to FIGS. 13A-13E, the anamorphic image can be rendered within a non-rectangular virtual frame. In current video games, the CPU/GPU acquires and renders an image of a rectangle representing the game worlds. In contrast, in the illustrated embodiments the acquired image will be in the shape borders of a non-rectangular virtual frame. Although the present disclosure has presented only a limited number of embodiments of a non-rectangular virtual frame, it will be understood that the present disclosure and associated claims are not so limited. Those having ordinary skill will readily identify additional geometric forms for the virtual frame along the lines and within the spirit of the necessarily limited number of embodiments discussed herein.

Figure 14A:
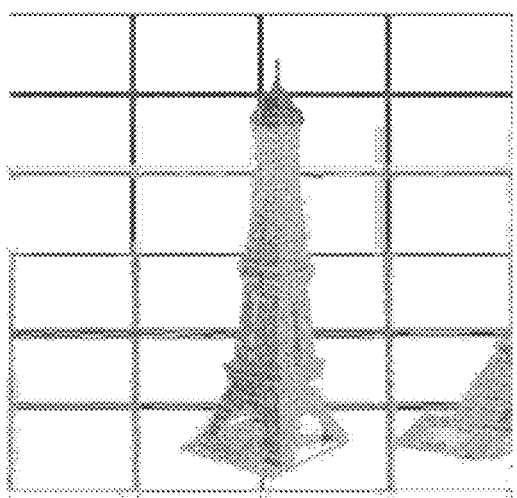
FIGS. 14A-14B are schematic views of images displayed on a traditional display.
Figure 14C:
FIGS. 14C-14D are schematic views of the images shown in FIGS. 14A-14B displayed as anamorphic images on the anamorphic display device.
Figure 14B:
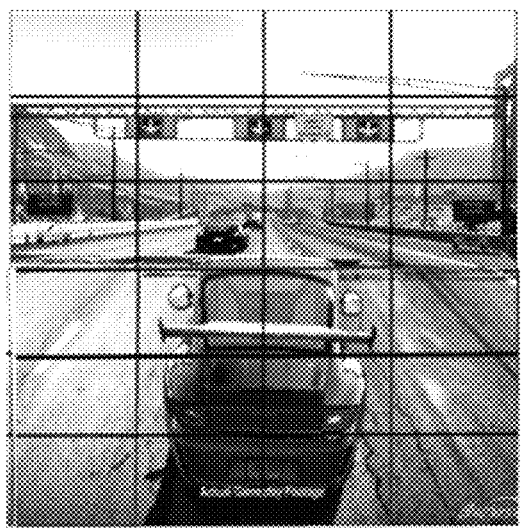
Figure 14D:
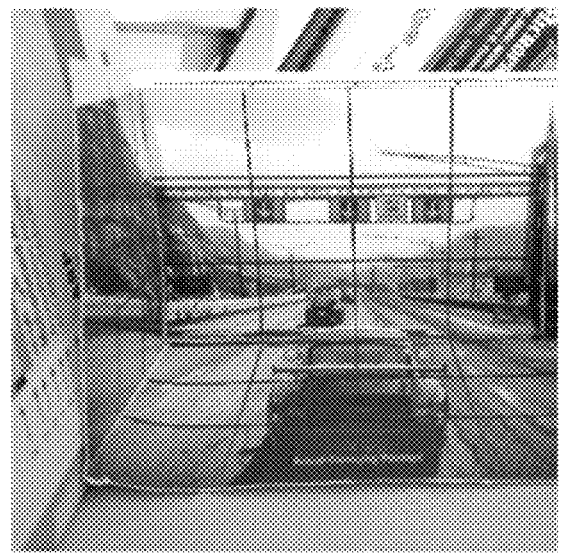
Figure 15A:
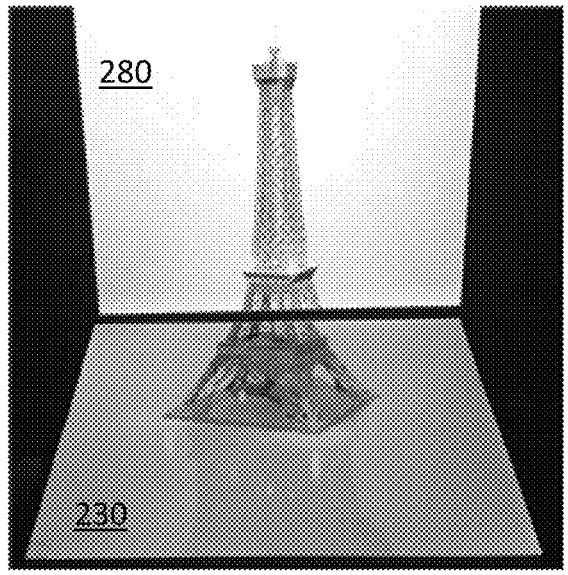
FIGS. 15A-15D are schematic views of images displayed on the anamorphic display device.
Figure 15C:
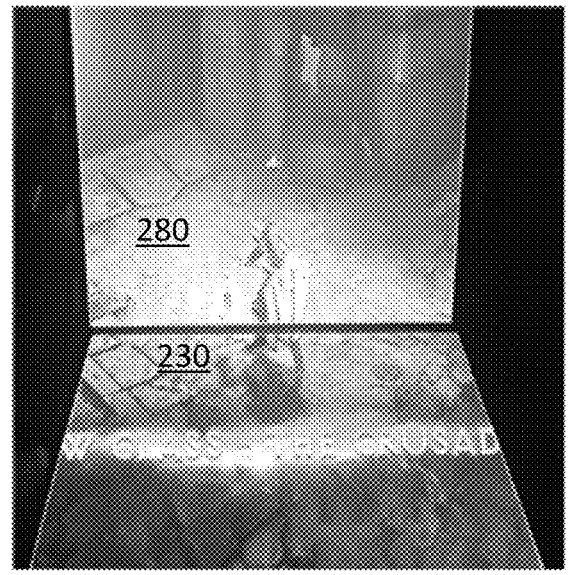
Figure 15B:
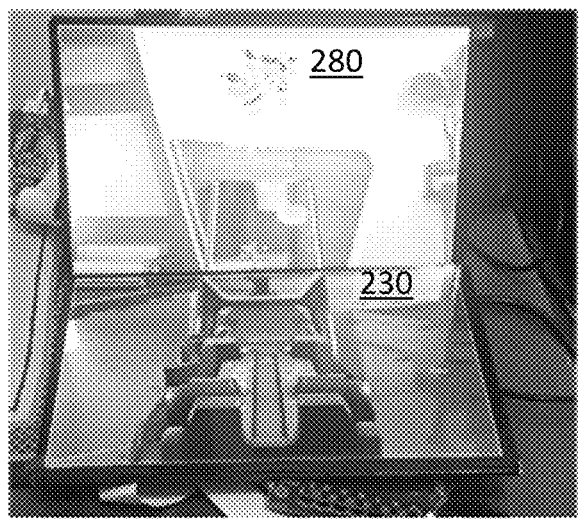
Figure 15D:
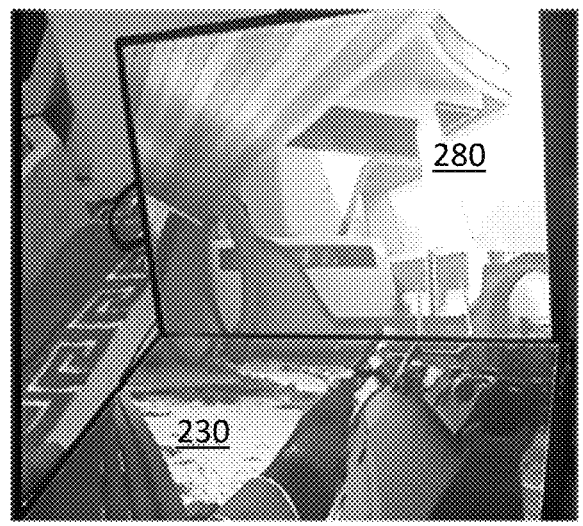

FIGS. 14A-14D show the difference between standard images of a subject and anamorphic images of that subject. For example, FIGS. 14A-14B are schematic views of images displayed on a traditional display. FIGS. 14C-14D show the images of FIGS. 14A-14B displayed as anamorphic images on the display device. By exporting spatially distorted images on the primary and secondary screens, the anamorphic display device according to the present disclosure can cancel the spatial or perspective distortion caused by the non flat surfaces appeared from the UPOV. FIGS. 15A-15D show various non-limiting examples of how images may appear on the combined primary and secondary displays of the anamorphic display device.

Figure 16:
FIG. 16 is a perspective view of a non-limiting embodiment of another anamorphic display device.

With continuing reference to FIG. 16, one of ordinary skill will recognize that the anamorphic display device of the present disclosure is not limited to a gaming attachment for use with game applications. For example, the anamorphic display device may be used for other purposes such as artistic design, video or photo editing, office applications, business applications, educational applications, and the like. In some embodiments, the 360°-foldable design of the anamorphic display device can allow multi-tasking for a single user, or allow two users to interact with each other or watch the same or different videos on two screens. In addition, many different types of computing devices may be attached to the gaming attachment, such as a tablet, smart phone, or portable game device.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

The terms "a," "an," "the" and similar referents used in the context of describing the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the disclosure and does not pose a limitation on the scope of the disclosure otherwise claimed. No language in the specification should be construed as indicating any non-claimed element essential to the practice of the disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. An anamorphic display device comprising: a secondary display configured to be detachably coupled to a computing device including a primary display; and a non-transitory device operatively coupled to the primary and secondary displays and having instructions thereon that are configured, when executed, to render an anamorphic image on at least one of the primary and secondary displays so as to create, in combination, a three-dimensional effect from a point of view facing the primary and secondary displays, wherein the secondary display includes an upward curved edge, and a bezel area of the primary display is hidden behind the upward curved edge of the secondary display.

2. The anamorphic display device of claim 1, wherein the secondary display is a touch screen.

3. The anamorphic display device of claim 1, wherein the non-transitory device is configured to render images on the primary and secondary displays that overlap with each other.

4. The anamorphic display device of claim 1, wherein the primary and secondary displays are hingedly coupled.

5. The anamorphic display device of claim 1, wherein the secondary display is movably coupled to the primary display to adjust an angle therebetween, wherein the anamorphic display device includes at least one angle sensor sensing the angle, and wherein the non-transitory device is configured to render the anamorphic image in dependence upon the angle sensed.

6. The anamorphic display device of claim 5, wherein the angle sensor includes an accelerometer.

7. The anamorphic display device of claim 1, wherein the anamorphic display device includes at least one point-of-view sensor sensing the point of view, and wherein the non-transitory device is configured to render the anamorphic image in dependence upon the point of view sensed.

8. The anamorphic display device of claim 7, wherein the point-of-view sensor includes a camera.

9. The anamorphic display device of claim 1, wherein the primary and secondary displays define substantially congruent display shapes.

10. The anamorphic display device of claim 1, wherein the secondary display is configured to be adjoined to the primary display when the secondary display is coupled to the computing device.

11. The anamorphic display device of claim 1 comprising at least one compartment for housing the computing device.

12. The anamorphic display device of claim 1, wherein the primary and secondary displays are operably coupled via a wired or wireless connection selected from the group consisting of a WiFi connection, a Bluetooth connection, a USB connection, an HDMI connection, a DVI connection, and a FireWire connection.

13. The anamorphic display device of claim 1, wherein the computing device is selected from the group consisting of a smart phone, a tablet, and a portable gaming console.

14. The anamorphic display device of claim 1, wherein the instructions are further configured, when executed, to convert an undeformed image into the anamorphic image.

15. The anamorphic display device of claim 1, wherein the instructions are further configured, when executed, to generate a non-rectangular virtual frame and to render the anamorphic image within the non-rectangular virtual frame.

16. The anamorphic display device of claim 1, wherein the instructions are further configured, when executed, to render a gaming interactive event on the primary display.

17. The anamorphic display device of claim 16, wherein the gaming interactive event causes a user of the computing device to act or react.

18. The anamorphic display device of claim 1, wherein the instructions are further configured, when executed, to render a gaming non-interactive event on the secondary display.

19. The anamorphic display device of claim 18, wherein the gaming non- interactive event includes a peripheral display element.

20. A method for displaying an anamorphic image, the method comprising: generating, via a processor, a non-rectangular virtual frame; rendering, via the processor, an anamorphic image within the non-rectangular virtual frame; and causing, via the processor, an anamorphic display device comprising primary and secondary displays to display the anamorphic image, so as to create, in combination, a three-dimensional effect from a point of view facing the primary and secondary displays, wherein the secondary display includes an upward curved edge, and a bezel area of the primary display is hidden behind the upward curved edge of the secondary display.

* * * * *